United States Patent [19]
Charnley et al.

[11] 3,803,874
[45] Apr. 16, 1974

[54] METHOD OF MAKING GLASS SEALS

[75] Inventors: Peter W. Charnley, Doylestown; David R. Crichton, Furlong, both of Pa.

[73] Assignee: Honeywell, Inc., Minneapolis, Minn.

[22] Filed: Mar. 17, 1972

[21] Appl. No.: 235,735

[52] U.S. Cl. ................... 65/36, 29/581, 29/591, 65/42, 65/59
[51] Int. Cl. ............................................ C03b 23/20
[58] Field of Search .................... 65/36, 42, 59; 29/580–582, 591, 577, 587

[56] References Cited
UNITED STATES PATENTS

| | | | |
|---|---|---|---|
| 2,977,257 | 3/1961 | Lynch et al. | 29/582 X |
| 3,149,375 | 9/1964 | Gehl | 65/59 X |
| 3,502,837 | 3/1970 | Peehs | 65/59 X |
| 3,607,174 | 3/1970 | Patrick | 65/36 X |
| 3,715,197 | 2/1973 | Nalepka | 65/42 X |

FOREIGN PATENTS OR APPLICATIONS

| | | | |
|---|---|---|---|
| 789,612 | 1/1958 | Great Britain | 65/54 |
| 1,913,985 | 10/1970 | Great Britain | 65/59 |

Primary Examiner—Robert L. Lindsay, Jr.
Attorney, Agent, or Firm—Arthur H. Swanson; Lockwood D. Burton; John Shaw Stevenson

[57] ABSTRACT

A unique hermetic seal to join an inner wall of a ring shaped member made of a semi-conductor silicon material and a glass tube which is positioned within and spaced away from the inner wall of the ring uniformally heating the ring and the tube with the assistance of a carbon block which surrounds these parts as a heat transferring agent to change the glass from a brittle to a ductile state and applying the weight of a tapered mandrel against the inner wall of the ductile tube so that the outer wall of the tube will be forced into a fused, hermetic sealed engagement with the material forming the bored out wall portion of the silicon ring.

3 Claims, 4 Drawing Figures

METHOD OF MAKING GLASS SEALS

BACKGROUND OF THE INVENTION

The aforementioned thermally sealed glass tube and silicon ring can be beneficially employed in any one of a number of applications where two parts containing these materials, or other like materials, are required to be joined together to form a hermetic seal. One specific beneficial use of such a hermetic seal has been in joining a tube forming a fluid passageway to a base portion of a differential fluid pressure sensing chamber that is constructed of a silicon material such as is shown in the John A. Weaver et al. U.S. Pat. No. 3,712,143.

PROBLEMS

Prior to the present invention other various methods have heretofore been employed in an attempt to form a suitable substantially strain free hermetic seal between a glass tube and the inner wall of a ring that is employed as a base member of, for example, the aforementioned differential fluid pressure sensing chamber that is made of a silicon material.

One such method employs an epoxy resin to join the tube and ring shaped parts together and another employs a metal to either braze or solder these two parts together.

Experimentation has shown that neither one of the aforementioned two methods will provide a satisfactory hermetic seal between the aforementioned tube and ring shaped parts. The reason for this is that since the epoxy as well as the brazing or solder material each have a different coefficient of thermal expansion from that of the silicon and glass parts that they are employed to seal, undesired strains will therefore be introduced into the ring shaped part when either the epoxy, brazing or solder materials are used for this purpose.

Experimentation has further shown that these undesired strains are also transmitted through the sidewalls into the top wall of the fluid pressure sensing chamber where a resistance bridge is employed to sense the difference in magnitude of a high and low fluid pressure applied to its external and internal surfaces. The use of epoxy resin or metalized seals cannot therefore be used because the aforementioned undesired strains which they introduce prevent a true value of the differential pressure under measurement from being obtained.

SUMMARY OF THE INVENTION

A hermetic seal is provided between a glass tube and a silicon wall of a differential pressure sensing chamber by selecting a material for the tube that has the same coefficient of thermal expansion as the material from which the wall of the chamber is made by uniformally heating the tube and ring shaped wall until the tube is in a ductile state and allowing an applied force to move a tapered mandrel in a downward direction through the portion of the tube that is adjacent to the part that is to be joined to the ring so that the tube can be expanded into surface to surface contact with the ring to form a fused hermetic seal between these parts without any undesired strain being introduced into these parts.

The aforementioned hermetic seal will not therefore transmit undesired strains through the remaining portion of the differential pressure chamber. Furthermore when the two parts are joined in the aforementioned manner a resistance bridge output measurement resulting from a high and low pressure fluid being applied to different separate opposite sides of the wall of the chamber on which this bridge is mounted will be a true measurement of the differential fluid pressure that is desired.

BRIEF DESCRIPTION OF THE DRAWINGS

A better understanding of the present invention may be had when the following detailed description is read in connection with the accompanying drawings in which.

A DETAILED DESCRIPTION

Figure 1:
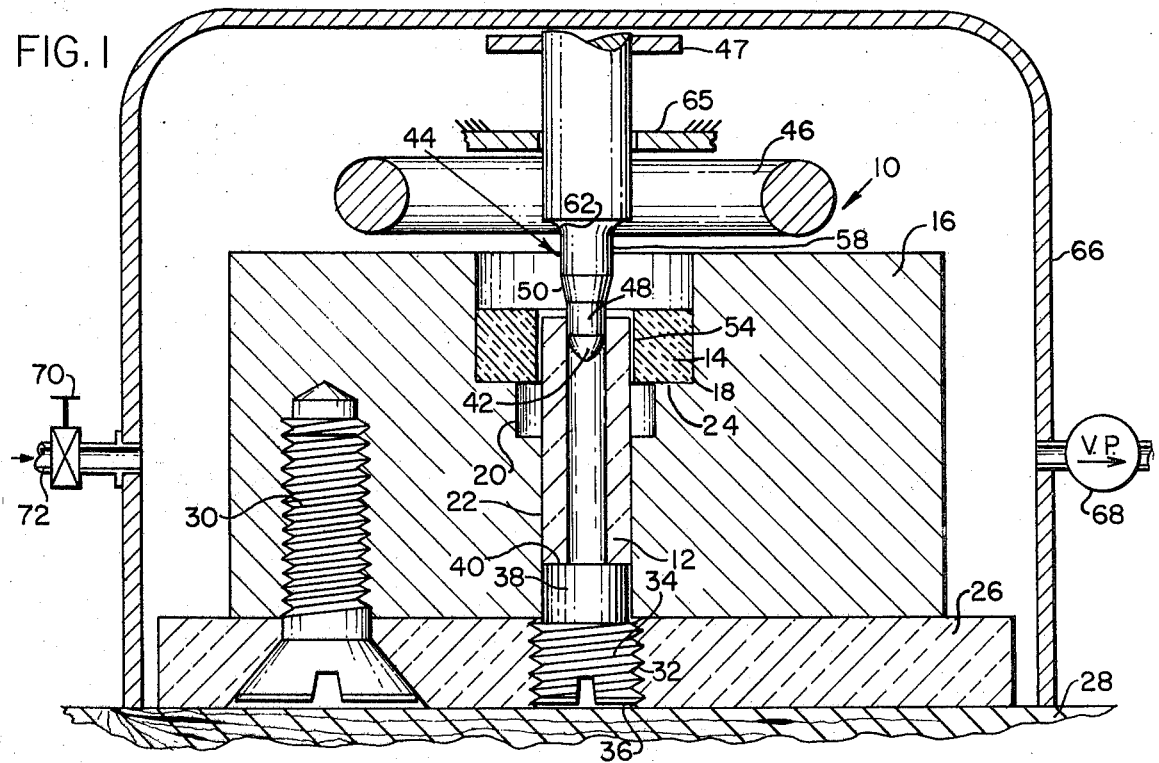
FIG. 1 is an elevation view showing the ring and tube mounted within a carbon block; an induction coil supplying heat by way of the block to the ring and tube and a mandrel in a position to move downwardly through the tube when a force is applied thereto.

FIG. 1 shows an apparatus 10 that is employed to provide a hermetic seal between two parts such as a glass tube 12 and a ring shaped part 14 that is made of a semi-conductor silicon material or may be made of other similar materials whose coefficient of thermal expansion are closely matched with one another.

Figure 3:
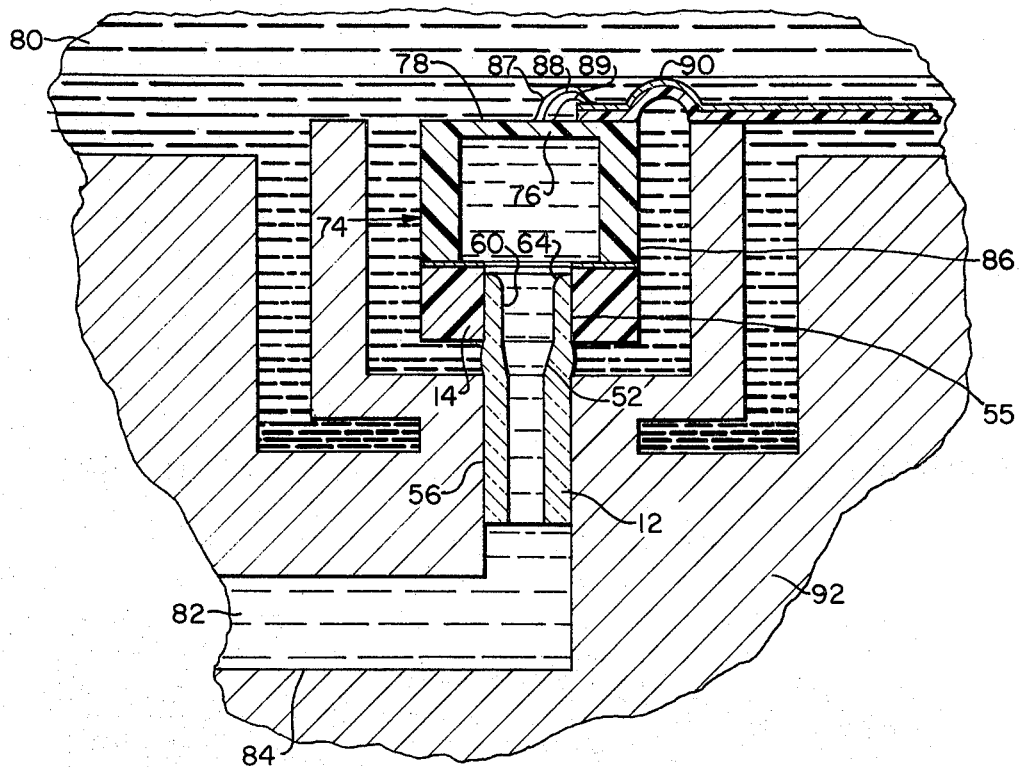
FIG. 3 shows one of the many different applications in which a ring and tube connection, made by the process shown in FIGS. 1 and 2, is employed to form an integral fluid passageway and base portion for use in the previously mentioned differential pressure sensing chamber
Figure 4:
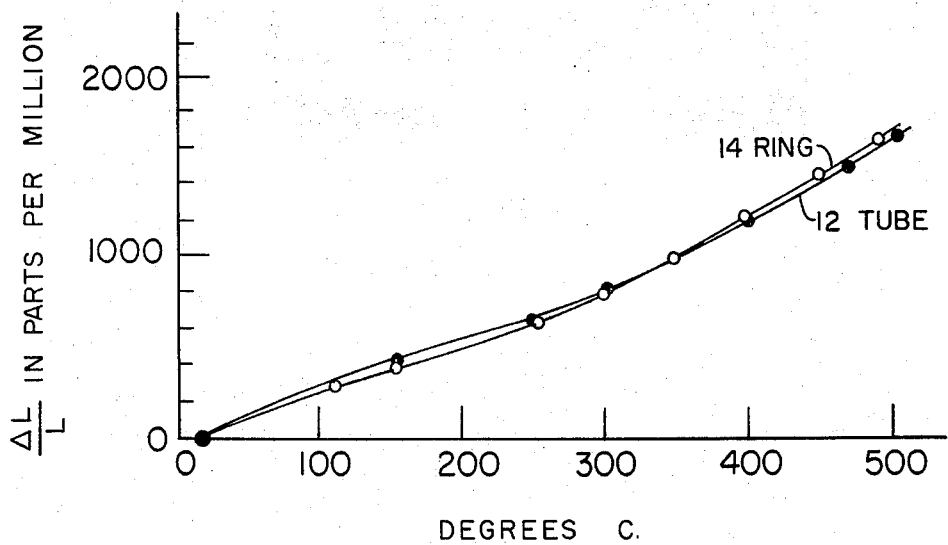
FIG. 4 shows that the coefficient of thermal expansion characteristic for each of the aforementioned silicon and glass parts are closely matched with one another by properly selecting two materials of this type that will produce this result.

As shown in FIG. 3 the glass tube 12 is made of a material which has substantially the same coefficient of thermal expansion as the ring shaped part 14 and is preferably a borosilicate glass, identified as 7740 Corning.

The apparatus 10 is provided with a carbon block 16 containing three cylindrical parts 18, 20, 22 that form bored out wall portions therein that are each of a different diameter.

The first of the aforementioned bored out wall portions 18 is shown surrounding the ring shaped part 14. The ring shaped part 14 in turn is supported on a flat ring like surface 24 that extends between the bored out walls 18 and 20.

The second bored out wall portion 20 in the carbon block 16 forms a recess therein that surrounds a portion of the tube 12.

The third bored out wall portion 22 surrounds and is spaced in close proximity to the tube 12 that passes therethrough.

Figure 2:
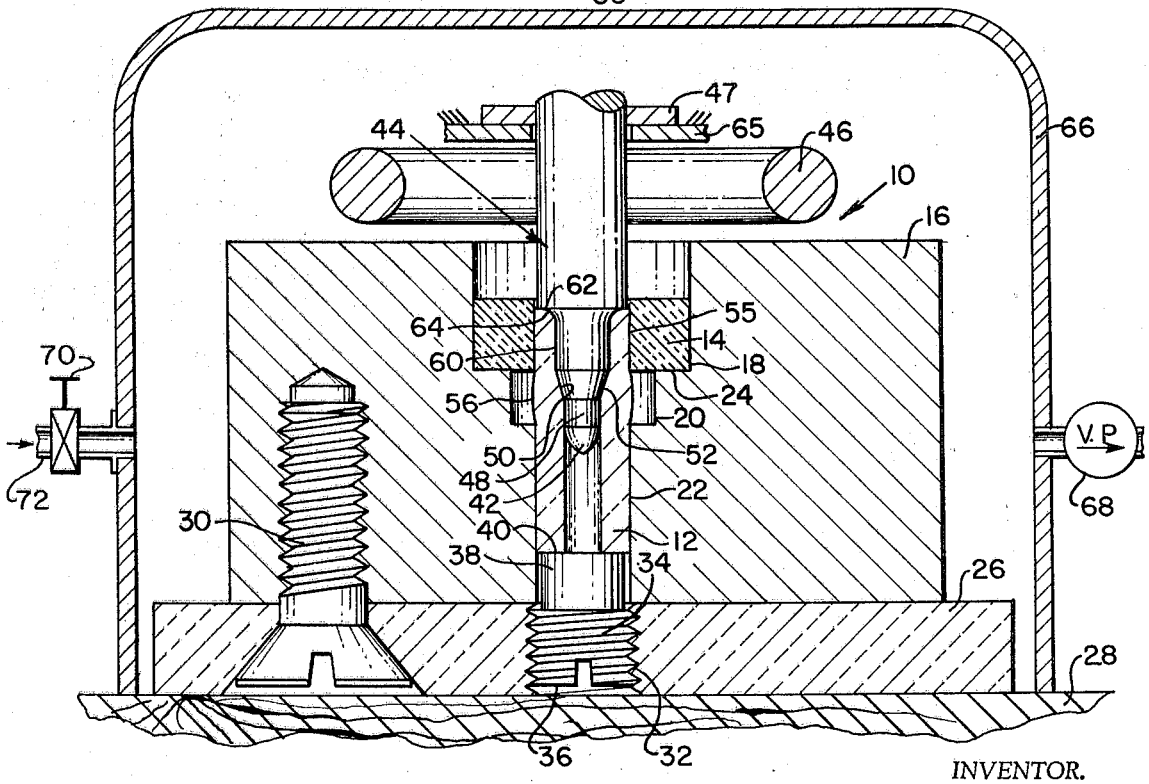
FIG. 2 is an elevation view which shows the position that the aforementioned mandrel will take after it has been lowered into the tube and has caused a portion of the heated ductile tube to flow into sealed engagement with the heated inner wall of the ring to form a hermetic seal therebetween.

An insulated block of material 26 such as the material tradenamed TRANSITE is employed as shown in FIGS. 1 and 2 to support the carbon block 16 and to provide insulation between the block 16 and a stationary support member 28 on which said block of insulating material 26 is positioned.

The insulating block 26 is in turn fixedly connected to the carbon block 16 by means of a suitable number of screw connections such as the screw connection 30 shown in FIGS. 1 and 2. The insulating block 26 is also provided with a threaded bored out wall portion 32. A threaded end portion 34 of a stop member 36 is shown in an adjustably threaded fixed position in the threaded, bored out wall portion 32. The non-threaded upper end portion 38 of the stop member 36 is shown protruding through and in spaced apart relation with the bored out wall portion 22 and is employed to contact and support the tube 12 at its lower end 40 in any one of a number of preselected fixed positions. The provision of the stop member 36 will allow the upper end of the tube to be positioned at a desired selected spaced apart position from the upper flat surface of the ring 14.

The lower end portion 42 of a mandrel 44 is shown in FIG. 1 protruding into the upper end of the tube 12. While the mandrel 44 is in the position shown in FIG. 1, heat will be applied to it from an induction coil 46. While the apparatus 10 is in this FIG. 1 position, heat from this induction coil 46 will also travel in a downward direction through the top portion of the tube 12 and ring 14 and also through the carbon block 16 and thence through the outer periphery of the tube 12 and ring 14 so that complete uniform heating of the tube 12 and ring 14 will occur.

When the glass material forming the tube 12 has been changed by the heat of the induction coil 46 from its cool, brittle state to a ductile state, in which the outer peripheral surface of the glass tube develops a liquid film surface thereon, the mandrel 44 attached thereto is then allowed to move as a unit in a downward direction in the tube from its FIG. 1 position to its FIG. 2 position with plate 47.

As the aforementioned downward movement of the mandrel 44 takes place a cylindrical portion 48 of the mandrel 44 which is in sliding fit engagement with the upper end of the tube is moved in a downward direction in the tube 12 and will thereby align the longitudinal axis of the tube 12 with the longitudinal axis of the mandrel 44. As the enlarged tapered portion 50 of the mandrel 44 is moved from the position shown in FIG. 1 to a position shown in FIG. 2 a tapered surface 52 will be formed in the tube by this tapered mandrel portion 50 as is best shown in FIGS. 2 and 3.

Downward movement of the tapered portion 50 will also cause the ductile tube 12 to be forced in an outward direction and the aforementioned outermost peripheral liquid film surface of the tube 12 to be brought into contact with the inner wall 54 of the ring shaped member 14 to fuse these two surfaces and to form a hermetic seal 55 between the tube 12 and the ring 14.

While the mandrel 44 is moved in a downward direction from its FIG. 1 to its FIG. 2 position the ductile material of the glass tube will be forced to flow outwardly as shown at 56 and into the recessed wall portion 20 that is formed in the carbon block 16.

The aforementioned outward movement of the mandrel 44 will also cause the upper cylindrical portion 58 to be brought into contact with the aforementioned inner surface of the tube 12 to provide a smooth cylindrical surface 60 along the inner wall of the tube 12 so that this surface will be spaced at the same radial distance from the longitudinal center line of the mandrel 44 as it is from the center line of the tube 12 as is shown in FIGS. 2 and 3.

While the mandrel 44 is moved between the FIGS. 1 and 2 position the anular curved surface 62 on the mandrel 44 will cause the top inner edge of the tube 12 to be forced outwardly to form a smooth curved surface 64 in the form of a flared edge on the top of the glass tube 12.

When the mandrel 44 reaches the position shown in FIG. 2 in its downward travel, further downward movement of the mandrel will be prevented because the plate 47 that is attached to the mandrel will be brought into contact with an anular stationary stop member 65 that extends about and is spaced from the mandrel 44.

In order to extend the life of the mandrel 44 which is made of a hard steel material such as tungsten and to protect it from oxidation the aforementioned simultaneous heating and fusing operation is performed in an evacuated vessel 66 that is inverted and placed on top of the stationary support member 28 and which is then filled with a suitable inert gas such as nitrogen.

This is accomplished by providing a vacuum pump 68 to evacuate air from the vessel 66 and by providing a valve 70 and an inlet passageway 72 located at an opposite side of the vessel 66 through which a desired amount of the aforementioned nitrogen under pressure can be introduced into the evacuated vessel.

FIG. 3 shows the ring shaped part 14 in hermetic sealed engagement with the tube 12. FIG. 3 also shows one application of how the ring shaped part 14 can be beneficially employed to form a base portion of a differential fluid pressure silicon sensing chamber 74 such as is shown in the Weaver et al. U.S. Pat. No. 3,712,143.

The aforementioned silicon chamber 74 has a wafer thin silicon upper wall 76. The upper surface of the wall 76 contains a diffused, fully active resistance bridge 78 for sensing changes in a differential fluid pressure. The high pressure fluid 80 which forms one of these fluid pressures is shown being applied to the top surface of the upper wall 76 of the semiconductor silicon chamber 74.

A lower pressure fluid 82 which forms another of these fluid pressures is applied by way of the passageway 84, the glass tube 12, the upper part of the silicon ring 14 and the silicon sidewalls 86 of the chamber 74 to the bottom surface of the upper wall 76.

A suitable number of fine jump wires, for example, the wires 87, 88, 89 extend between the resistance bridge pressure sensing element 78, formed on the silicon semi-conductor wafer 76, and an electrical head frame 90 which in turn is connected by means of a header, not shown, but which is mounted in an outer body portion 92. Changes in resistance experienced by the resistance bridge due to changes in the low and high fluid pressure 82, 80 acting thereon can thus be transmitted to any desired location as is disclosed in more detail in the aforementioned Weaver et al. U.S. Pat. No. 3,712,143.

From the aforementioned it can be seen that no undesired strains are introduced by the unique hermetic seal either between the glass tube 12 and the semiconductive silicon base 14 of the aforementioned chamber 74, or from the base 14 through the sidewall of this chamber 74 to the wafer thin silicon upper wall 76 which contains the fully active resistance bridge 78.

The embodiments of the invention in which an exclusive property or privilege is claimed are defined as follows:

1. A method of forming a hermetic seal between the inner wall of a ring shaped part that is constructed of a semi-conductor silicon material and the other peripheral surface portion of a glass tube without altering the inherent physical and electrical characteristics of said ring shaped part, comprising the first step of inserting said ring shaped part and tube through an opening in a block of heat transmitting material and supporting the ring and tube on the wall of said block forming said opening in close proximity with one another, the second step of uniformly heating said block, ring and tube until said tube becomes ductile and the third step of employing a mandrel to expand said tube into a fused substantially non-strain inducing contact with the said semi-conductor ring shaped part.

2. The method of forming a hermetic seal as defined in claim 1 wherein said mandrel is employed in a position against said ductile tube so that an applied force acting on said mandrel will move it in a downward direction while the third step is being performed and wherein all three steps take place within an evacuated chamber into which an inert gas has been introduced.

3. The method of forming a hermetic seal as defined in claim 1 wherein said block is a carbon material, said heating is accomplished by and induction heat source, and wherein a recess is formed in said block to allow an outer surface of said tube extending away from said seal to expand therein while the third step is being performed.

* * * * *